(12) United States Patent
Smith

(10) Patent No.: US 11,951,659 B2
(45) Date of Patent: Apr. 9, 2024

(54) WIND TURBINE BLADE BODY MANUFACTURING METHOD

(71) Applicant: Vestas Wind Systems A/S, Aarhus N. (DK)

(72) Inventor: Jonathan Smith, Southampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 398 days.

(21) Appl. No.: 17/299,450

(22) PCT Filed: Dec. 5, 2019

(86) PCT No.: PCT/DK2019/050379
§ 371 (c)(1),
(2) Date: Jun. 3, 2021

(87) PCT Pub. No.: WO2020/114565
PCT Pub. Date: Jun. 11, 2020

(65) Prior Publication Data
US 2022/0055320 A1    Feb. 24, 2022

(30) Foreign Application Priority Data
Dec. 6, 2018    (DK) .......................... PA 2018 70800

(51) Int. Cl.
*B29C 33/30*    (2006.01)
*B29C 43/12*    (2006.01)
(Continued)

(52) U.S. Cl.
CPC ............ *B29C 33/306* (2013.01); *B29C 43/12* (2013.01); *B29C 43/14* (2013.01); *B29C 70/302* (2021.05); *B29C 70/446* (2013.01); *F03D 13/10* (2016.05); *B29L 2031/085* (2013.01); *F05B 2230/50* (2013.01); *F05B 2240/302* (2013.01)

(58) Field of Classification Search
CPC . B29C 33/306; B29C 70/446; F05B 2230/50; F05B 2240/302; F03D 13/10; B29L 2031/085
See application file for complete search history.

(56) References Cited

FOREIGN PATENT DOCUMENTS

| CN | 103350467 A | 10/2013 |
|---|---|---|
| DE | 102012223810 A1 | 6/2014 |

(Continued)

OTHER PUBLICATIONS

English machine translation of Lamm et al. (WO 2014/095856 A1), obtained Sep. 27, 2023, Espacenet.com (Year: 2023).*

(Continued)

*Primary Examiner* — Michael M. Robinson
(74) *Attorney, Agent, or Firm* — Wood Herron & Evans LLP

(57) ABSTRACT

The invention provides a wind turbine blade body manufacturing method, the method comprising the steps of: providing a mould (40) having an elongated mould surface (43), placing a movable insert (50) on the mould surface, in a first position, forming, with the insert in the first position, a first blade body having a first length (L1), placing the insert (50) on the mould surface, in a second position, and forming, with the insert in the second position, a second blade body having a second length (L2) which is different from the first length.

16 Claims, 12 Drawing Sheets

(51) Int. Cl.
    *B29C 43/14*    (2006.01)
    *B29C 70/30*    (2006.01)
    *B29C 70/44*    (2006.01)
    *B29L 31/08*    (2006.01)
    *F03D 13/10*    (2016.01)

(56) References Cited

FOREIGN PATENT DOCUMENTS

| | | |
|---|---|---|
| DE | 102014001445 A1 | 8/2015 |
| EP | 2700812 A1 | 2/2014 |
| WO | 2014095856 A2 | 6/2014 |
| WO | 2017088883 A1 | 6/2017 |

OTHER PUBLICATIONS

Danish Patent and Trademark Office, Search and Examination Report in PA 2018 70800, dated Jun. 6, 2019.
European Patent Office, International Search Report and Written Opinion in PCT Application No. PCT/DK2019/050379, dated Feb. 11, 2020.

\* cited by examiner

WIND TURBINE BLADE BODY MANUFACTURING METHOD

The present invention relates to a wind turbine blade body manufacturing method, a wind turbine blade installation method, a wind farm, and a wind turbine blade body manufacturing apparatus. The present invention provides improvements in wind turbine blade manufacturing.

BACKGROUND

Modern wind turbine blades typically comprise a blade shell having a laminate structure of composite construction. The shell is commonly manufactured using a prepreg or vacuum-assisted resin infusion process in a female mould. Wind turbine blades are of considerable length, at present up to 80 meters in length and the moulds in which the blades are formed have a substantial cost. Traditionally, manufacturing a new length of rotor blade requires the manufacturing of a new mould with significant cost.

WO2017088883A1 discloses a mould having a mould surface for forming a first wind turbine blade. A removable insert is placed on the mould surface, to form a modified mould surface for forming a second blade body which is shorter than the first blade body. Thereby, a single mould can be used to manufacture two blade bodies of different length. This significantly reduces mould costs, since it increases flexibility in wind turbine blade production, and removes the need for a complete mould for the second blade. There is nevertheless a desire to reduce costs further in wind turbine blade production.

The present invention thus aims to reduce costs in wind turbine blade production.

SUMMARY

According to a first aspect of the present invention there is provided a wind turbine blade body manufacturing method, the method comprising the steps of:

providing a mould having an elongated mould surface, herein also referred to as a primary mould surface, placing a movable insert on the primary mould surface, in a first position, forming, with the insert in the first position, a first blade body having a first length, placing the insert on the primary mould surface, in a second position, and forming, with the insert in the second position, a second blade body having a second length which is different from the first length.

It is understood that the second position is different from the first position. The insert may present an insert mould surface. By placing the insert on the primary mould surface, in the first position, or in the second position, the primary mould surface, and the insert mould surface form together what is herein referred to as a combined mould surface. The combined mould surface is used to form the first and second blade bodies. By moving the insert from the first position to the second position, or vice versa, the combined mould surface is changed. The length of the combined mould surface depends on the position of the insert along the primary mould surface.

The first and second positions may be distributed along the longitudinal direction of the primary mould surface. Placing the insert on the primary mould surface may result in a portion of the primary mould surface to be excluded from the combined mould surface. The mould may be elongated, and parallel with the primary mould surface. The mould may have a mould root end, at which the primary mould surface is arranged to form a root end of a blade body. The mould may have a mould distal end, at an end of the mould which is opposite to the root end. The first and second positions of the insert may be towards the distal end of the mould.

Moving the blade insert from the first position to the second position, or vice versa, provides for using the mould for producing blade bodies of different lengths. The invention provides for using the insert for producing the first as well as the second blade body. Thereby, the mould itself does not need to be provided with a part for forming a tip of the blade bodies. This simplifies the production of the mould, thereby saving costs. Alternatively, a portion of the primary mould surface may present a shape which is similar to, or the same as, the shape of the insert mould surface. Thereby, the primary mould surface may, without the insert, allow for the forming of a further, third blade body. Thereby, the need for a complete mould for the third blade is removed. Thereby, the cost for such a mould is saved.

The first and second blade bodies may each comprise a wind turbine blade shell or half shell. The first and second blade bodies may each extend from a respective root end to a respective tip end. The mould may be a part of an apparatus in the form of a mould system. Thereby, the mould could be a first mould, the system comprising a second mould. As is known per se, the first and second moulds may be adapted to form a respective blade body, in the form of a respective blade half shell. The mould system may be adapted to join the half shells, possibly with an intermediate structure, to form a wind turbine blade. For this, the system may be provided with a turner assembly, joining the moulds and being adapted to turn one of the moulds over the other one, to bring the mould halves together for being joined.

Thus, in examples, the step of providing a mould may comprise providing a first mould, the method further comprising providing a second mould having an elongated mould surface, placing a second movable insert on the mould surface of the second mould, in a further first position, and forming, with the second insert in the further first position, a further first blade body having the first length. Thereupon, the first blade bodies may be joined to form a first blade. The method may further comprise placing the second insert on the mould surface of the second mould, in a further second position, and forming, with the second insert in the further second position, a further second blade body having the second length. Thereupon, the second blade bodies may be joined to form a second blade.

The primary mould surface may extend from a mould root end to a mould tip end. As exemplified below, the tip end of the primary mould surface may, or may not, have a shape for forming a tip end of a blade body.

Preferably, where the primary mould surface extends from a mould root end to a mould tip end, the primary mould surface comprises a portion presenting a constant cross-section. Thereby, the steps of placing the insert, in the first and second positions, may comprise placing the insert with a proximal end thereof facing toward the mould root end, and placing the proximal end within the constant cross-section portion. Preferably, the proximal end has a shape which is substantially the same as the cross-sectional shape of the constant cross-section portion.

By the primary mould surface comprising a portion presenting a constant cross-section, the mould insert can be placed at any position between two extreme positions. Such extreme positions may be at opposite ends of the constant cross-section portion. The insert may have a shape which is complementary to the constant cross-section portion. Thereby, the length of the blade bodies produced may be infinitely variable within the limits provided by the constant cross-section portion. The insert may be formed with a rib structure, for example as described in said WO2017088883A1, incorporated herein by reference.

The primary mould surface comprising a portion presenting a constant cross-section means that two 2-dimentional cuts of the primary mould surface, at any two separated respective positions along the constant cross-section, will be the same. As described closer below, a twist of the primary mould surface may change, and the primary mould surface may be curved in the longitudinal direction. Thus, one of the 2-dimentional cuts may be rotated in relation to the other.

In practice, blade bodies may be produced with lengths differing in a stepwise manner, e.g. by 100-2000 mm, or 200-1000 mm, from one blade body to another. Thereby, blade lengths may be varied within a wind farm, from some wind turbines to others, in a manner which increases the energy output of the windfarm. Calculations done by the applicant suggest a 2% increase in the annual energy production (AEP) of a wind farm, with blade lengths differing by such relatively small steps. Embodiments of the invention provide for producing blades for such wind farms, without the need for excessive mould investments.

Preferably, a difference, at the first position and at the second position, of the orientation of the insert around a longitudinal axis of the primary mould surface, is linearly dependent on the distance between the first position and the second position. For example, where the primary mould surface comprises a portion presenting a constant cross-section, a twist of the primary mould surface may change, in the constant cross-section portion, linearly in the longitudinal direction of the primary mould surface. The insert may have a form which is complementary to the linearly changing twist of the primary mould surface. Thereby, the mould may be altered by moving the insert from the first position to the second position, without any special provisions needed in view of the changing primary mould surface twist. Thereby, blade bodies of different lengths, each with a change in twist, may be easily produced.

In some embodiments, a difference, at the first position and at the second position, of the orientation of the insert around a lateral axis of the primary mould surface, is linearly dependent on the distance between the first position and the second position. For example, at least a part of the primary mould surface may be curved in the longitudinal direction so as to provide a longitudinal bend on the blade bodies, the curvature of the primary mould surface being constant in the constant cross-section portion. Such a bend may be referred to as a pre-bend. The insert may have a form which is complementary to the constant curvature primary mould surface. Thereby, the mould may the altered by moving the insert from the first position to the second position, without any special provisions needed in view of the curved primary mould surface. Thereby, blade bodies of different lengths, each with a longitudinal bend, may be easily produced.

The insert may be secured in the first and second positions in a variety of manners. For example, as described in said WO2017088883A1, incorporated herein by reference, a gap may be provided between the insert and the primary mould surface. A vacuum may be applied between the insert and the mould to retain the insert in position on the primary mould surface. Preferably, the vacuum is applied to the gap between the insert and the primary mould surface.

Alternatively, or in addition, as also described in said WO2017088883A1, the insert may extend over a side surface of the mould and may be clamped to the mould. The side surface of the mould may have a negative draft angle.

Preferably, the steps of placing the insert, in the first and second positions, comprises fixing the insert in a lateral direction of the primary mould surface, by means of a mechanical locking arrangement extending along at least one of opposite longitudinal edges of the primary mould surface. The mechanical locking arrangement may comprise e.g. a track. In some embodiments, a track may extend along both opposite longitudinal edges of the primary mould surface. The opposite longitudinal edges of the primary mould surface may be parallel. The insert may be provided with engagement means for engagement with the locking arrangement. Thereby, moving and placing the insert correctly in relation to the primary mould surface may be easily done.

In some embodiments, fixing the insert comprises placing the insert so as to partly cover the locking arrangement, wherein a cover device is placed to cover a part of the locking arrangement not covered by the insert. Thereby, the covering device may, in addition to covering the part of the locking arrangement not covered by the insert, provide a portion of the primary mould surface. As exemplified below, such a primary mould surface portion may form at least one of opposite longitudinal edges of the primary mould surface.

The insert may extend between a proximal end facing toward the mould root end and a distal end facing away from the mould root end. Preferably, the insert presents an insert tip end for forming a tip of the first and second blade bodies. The insert tip end may form an end of the insert mould surface. The insert tip end may be at a distance, which may be relatively small, from the insert distal end. The insert when located in the first position may have the insert tip end at the first spanwise position, and the insert when located in the second position may have the insert tip end at a second spanwise position, which is different from the first spanwise position.

Preferably, the method comprises selecting the lengths of the first and second blade bodies based on required lengths of respective blades for a first wind turbine and a second wind turbine, and selecting the first and second positions to form the first and second blade bodies with the selected lengths.

According to a second aspect of the present invention there is provided a wind turbine blade installation method, comprising mounting on a first wind turbine in a wind farm, a first blade comprising the first blade body formed in the method according to any one of claims 1-9, and mounting on a second wind turbine in the wind farm, a second blade comprising the second blade body formed in the method according to any one of claims 1-9. According to a third aspect of the present invention there is provided a wind farm comprising a first wind turbine comprising a first blade comprising the first blade body formed in the method according to any one of claims 1-9, the wind farm further comprising a second wind turbine comprising a second blade comprising the second blade body formed in the method according to any one of claims 1-9.

The wind turbines may be horizontal axis wind turbines. As stated above, varying the blade lengths within a wind farm increases the energy output of the windfarm. The second and third aspects of the invention, provide for taking advantage of the cost reducing properties of the wind turbine blade body manufacturing method presented above.

According to a fourth aspect of the present invention there is provided a wind turbine blade body manufacturing apparatus comprising a mould, having an elongated mould surface, herein also referred to as a primary mould surface, extending from a mould root end to a mould tip end, and a movable insert, the apparatus being arranged to allow the insert to be placed on the primary mould surface, in a plurality of positions along the longitudinal direction of the primary mould surface, for forming blade bodies having respective lengths which are dependent on the insert position along the longitudinal direction of the primary mould surface. Advantages explained above regarding the first aspect of the invention, apply also to the fourth aspect of the invention.

The insert may be arranged to be placed on the primary mould surface towards the mould tip end, or at the mould tip end, so as for an insert mould surface to form, with at least a portion of the primary mould surface, a combined mould surface.

Preferably, the primary mould surface comprises a portion presenting a constant cross-section. Thereby, the insert may comprise a proximal end arranged to face toward the mould root end and a distal end arranged to face away from the mould root end. The distal end of the insert may be arranged to face towards the mould tip end. In some embodiments, the insert may be arranged to extend past the mould tip end.

The proximal end of the insert may have a shape which is substantially the same as the cross-sectional shape of the constant cross-section portion. The proximal end may have a shape which is complementary to the constant cross-section mould surface. Thereby, the proximal end of the insert will fit the primary mould surface, regardless of the position of the proximal end within the constant cross-section portion. The thickness of the insert at the proximal end may be no larger than 10 mm, preferably no larger than 5 mm. Thereby, a smooth transition, between the primary mould surface and the insert mould surface may be provided.

Further embodiments of the apparatus are defined in claims 15-18. Advantages thereof are understood from the description above of embodiments of the first aspect of the invention.

According to a fifth aspect of the present invention there is provided a wind turbine blade body manufacturing method, comprising forming a blade body with an apparatus according to any one of claims 12-18, and with the insert in one of the plurality of positions. Preferably, the blade body has a length within 90-100%, preferably 95-100%, of the length of the longest blade body that can be formed in the apparatus. Thereby, major portions of the blades produced using the apparatus may be identical. Such major portions may include roots and middle sections of the blades. The difference in length may be provided for by differences of the length of the tips of the blades. Thereby, the length adjustment is effected in regions of the blades with less structural material, compared to other regions.

BRIEF DESCRIPTION OF THE DRAWINGS

Examples of the invention will now be described in detail with reference to the following figures, in which.

DETAILED DESCRIPTION OF EMBODIMENTS OF THE INVENTION

Figure 1:
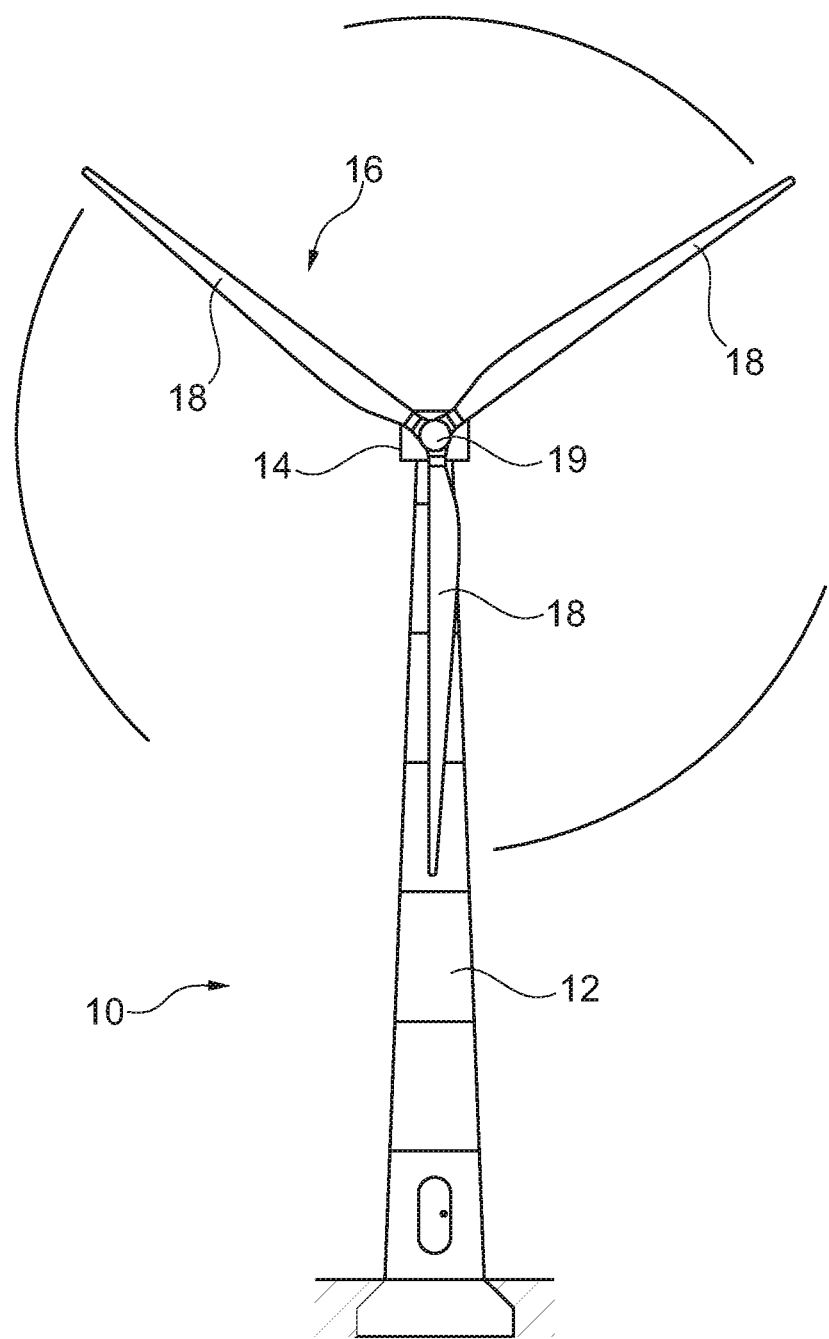
FIG. 1 is a view of a wind turbine.

FIG. 1 shows a horizontal axis wind turbine 10. The wind turbine 10 comprises a tower 12 supporting a nacelle 14 to which a rotor 16 is mounted. The rotor 16 comprises a plurality of wind turbine blades 18 that extend radially from a central hub 19. In this example, the rotor 16 comprises three blades 18.

Figure 2:
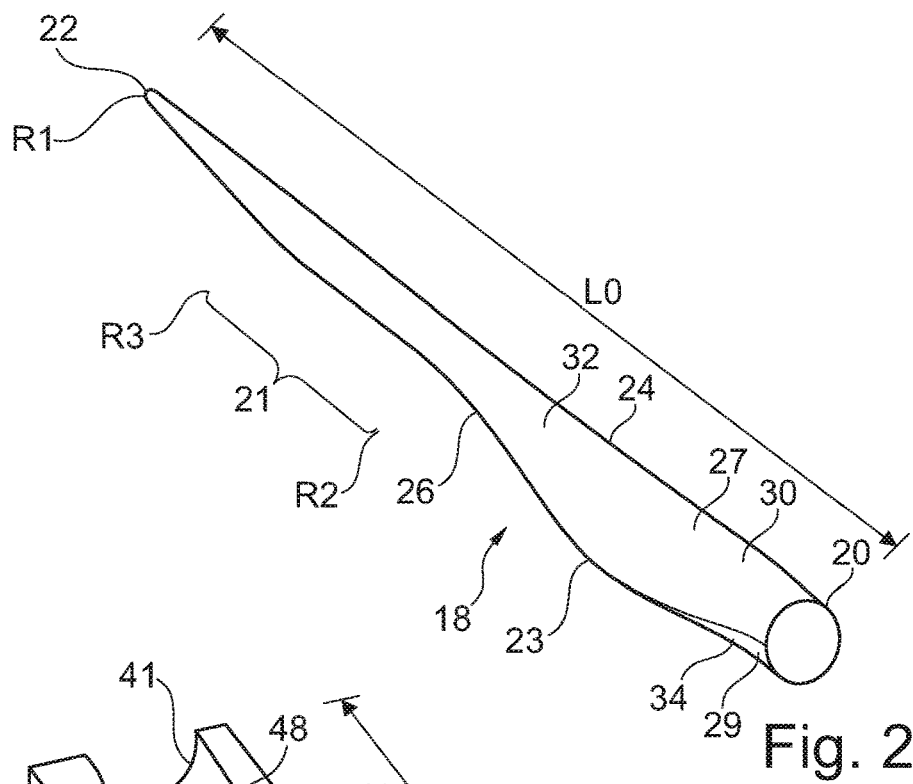
FIG. 2 is a perspective view of a wind turbine rotor blade.

FIG. 2 is a view of one of the blades 18 of the wind turbine 10. The blade 18 extends from a generally circular root end 20 to a tip end 22 in a longitudinal 'spanwise' direction, and between a leading edge 24 and a trailing edge 26 in a transverse 'chordwise' direction. The blade 18 comprises a shell 27 formed primarily of fibre-reinforced plastic (FRP). The shell 27 comprises a pressure surface 29 on a pressure side of the blade 18 and a suction surface 30 on a suction side of the blade 18. The blade has a length L0 in the spanwise direction extending from the root end 20 to the tip end 22. Spanwise positions on the blade can also be expressed in terms of a radius as measured from the rotational axis of the hub 19. In FIG. 2, the tip 22 is expressed as radius R1. The blade 18 transitions from a circular profile to an airfoil profile moving from the root end 20 of the blade 18 towards a shoulder 23 of the blade 18, which is the widest part of the blade 18 where the blade 18 has its maximum chord.

As explained closer below, a longitudinal portion 21 of the blade presents a constant cross-section. The constant cross-section portion 21 is located between the shoulder 23 and the tip end 22. The constant cross-section portion 21 extends from a radius R2 to a radius R3. From the shoulder 23 to the constant cross-section portion 21, the blade 18 has an airfoil profile of progressively decreasing thickness.

From the constant cross-section portion 21 to the tip end 22, the blade 18 has an airfoil profile of progressively decreasing thickness.

It should be noted that the proportions of the blade, in particular the constant cross-section portion 21 thereof, are provided for ease of understanding, and not necessarily representative of the shape of a blade produced in practice. Below, are some examples of blade dimensions which are practically interesting in the context of embodiments the invention.

The shell 27 of the blade is fabricated from first and second half shells 32, 34, herein also referred to as blade bodies. The first and second half shells 32, 34 are adhesively joined together along the leading edge 24 and the trailing edge 26. The half shells 32, 34 are laminated structures that are moulded from fibre reinforced plastic (FRP) including glass fibres and possibly carbon fibres.

The half shells 32, 34 are moulded in separate mould halves, herein also referred to as first and second moulds, of a blade body manufacturing apparatus. Once each half shell 32, 34 has been moulded, the two half shells 32, 34 are brought together by bringing the two mould halves together, and the half shells 32, 34 are bonded together to form the complete blade 18. Structural elements, such as webs or spars, may be provided between the half shells.

Figure 3:
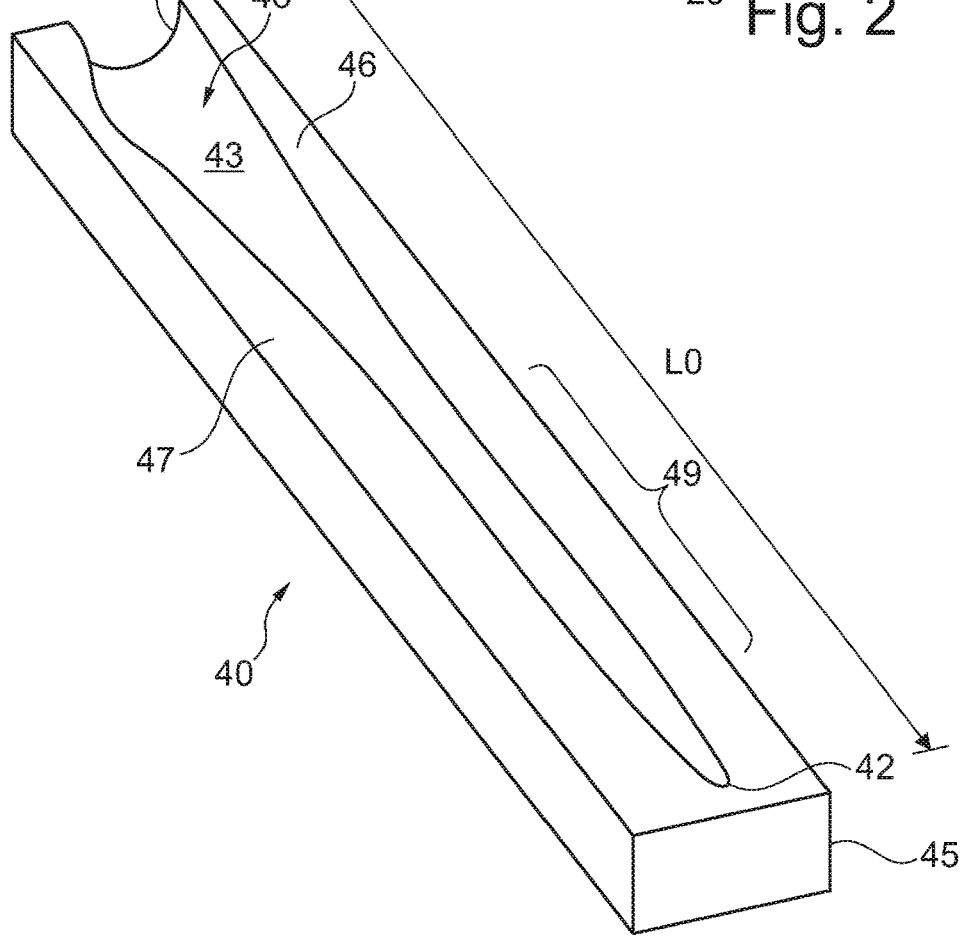
FIG. 3 is a perspective view of a wind turbine rotor blade mould used to produce a part of the blade in FIG. 2.

FIG. 3 shows a mould half 40 for forming one of the half shells 32, 34. The mould half will be referred to hereafter for convenience as the mould. The mould 40 comprises a mould root end 41 and a mould distal end 45. The half shell is formed on a mould surface 43, herein also referred to as a primary mould surface, having a shape corresponding to the shape of the half shell 44 to be formed. The primary mould surface extends from the mould root end 41 to a mould tip end 42.

The mould 40 has a leading flange 46 and a trailing edge flange 47 which extend from the mould root end 41 to the mould distal end 45. The primary mould surface 43 forms a recess 48 between the mould flanges 46, 47.

To form a half shell, one or more layers of glass-fibre fabric are placed on the primary mould surface 43 of the mould 40. These layers will later form an outer skin of the blade 18. Structural elements, including spar caps and sandwich core panels are then arranged on top of the outer fabric layers. One or more further layers of dry glass-fibre fabric are then placed over the structural elements, and will later form an inner skin of the blade. The glass-fibre layers are then impregnated with a resin, which is subsequently hardened to form a solid plastic material. Such an impregnation can be done with a vacuum assisted resin transfer moulding (VARTM) process, which is known per se, and not described closed here.

It is understood that alternatives for forming the half shell are possible. For example, layers of pre-preg glass fibres, i.e. glass fabric sheets impregnated with polymer resin, may be used.

The primary mould surface 43 has a length L0, i.e. the same as that of the blade in FIG. 2. Thus, the mould shown in FIG. 3 may be used to form a blade body, in the form of a half shell, for the blade in FIG. 2. It should be noted that the primary mould surface 43 comprises a portion 49 presenting a constant cross-section. The mould surface constant cross-section portion 49 forms part of the blade constant cross-section 21 shown in FIG. 2.

Figure 4:
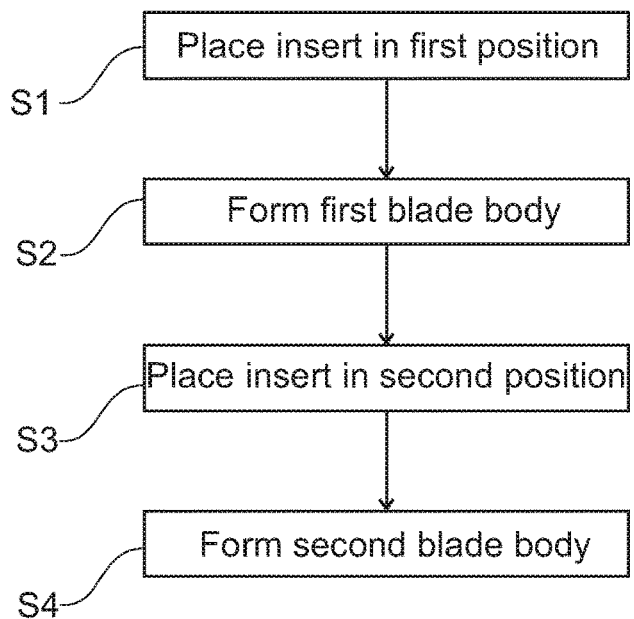
FIG. 4 is a block diagram showing steps in a method according to an embodiment of the invention.

Reference is made to FIG. 4, showing a block diagram depicting steps in a method according to an example. The method comprises placing S1 a movable insert 50 on the primary mould surface 43, in a first position.

Figure 5:
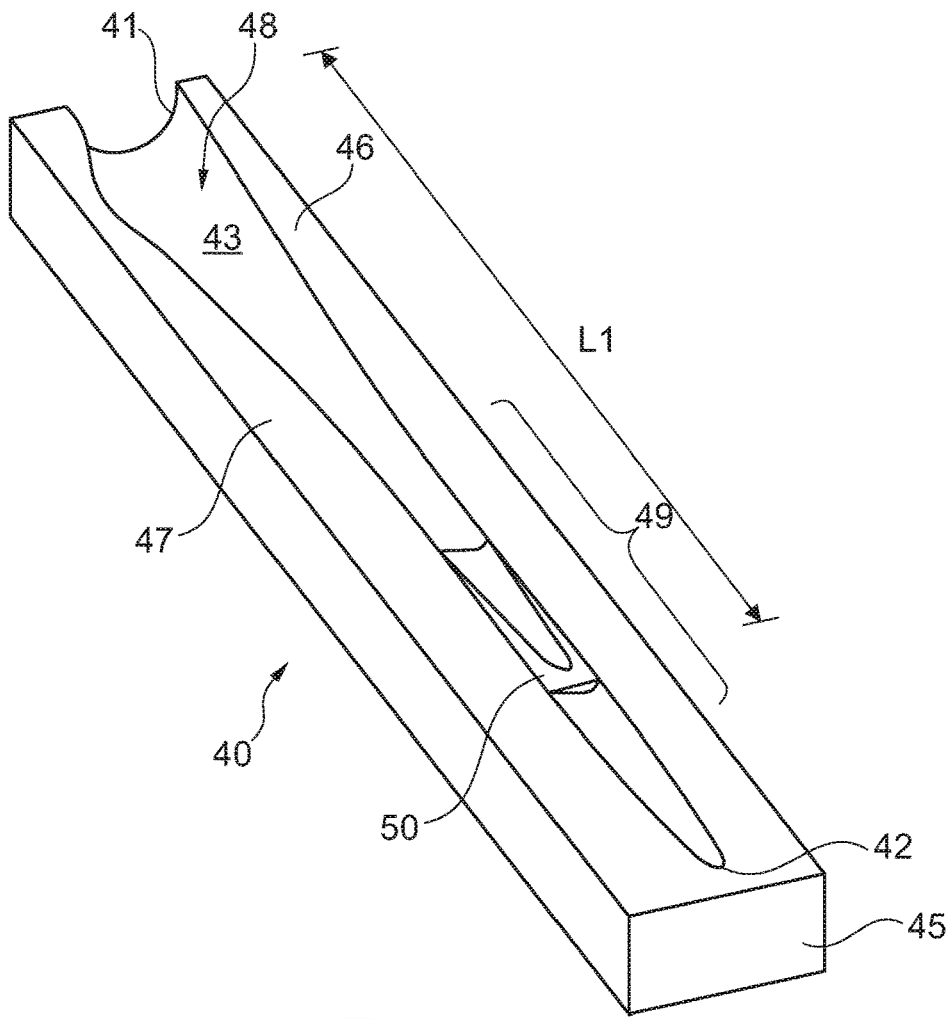
FIG. 5 shows the mould in FIG. 3 with an insert in a first position.

Reference is also made to FIG. 5, showing the insert 50 placed in the first position. The insert 50 is located in the mould recess 48. The insert 50 is placed within the constant cross-section portion 49. The insert 50 shortens the effective mould surface, i.e. the combined mould surface provided by the primary mould surface 43 and an insert mould surface. In FIG. 5, the length of the combined mould surface is L1 defined between the mould root end and an insert tip end 142.

Figure 6:
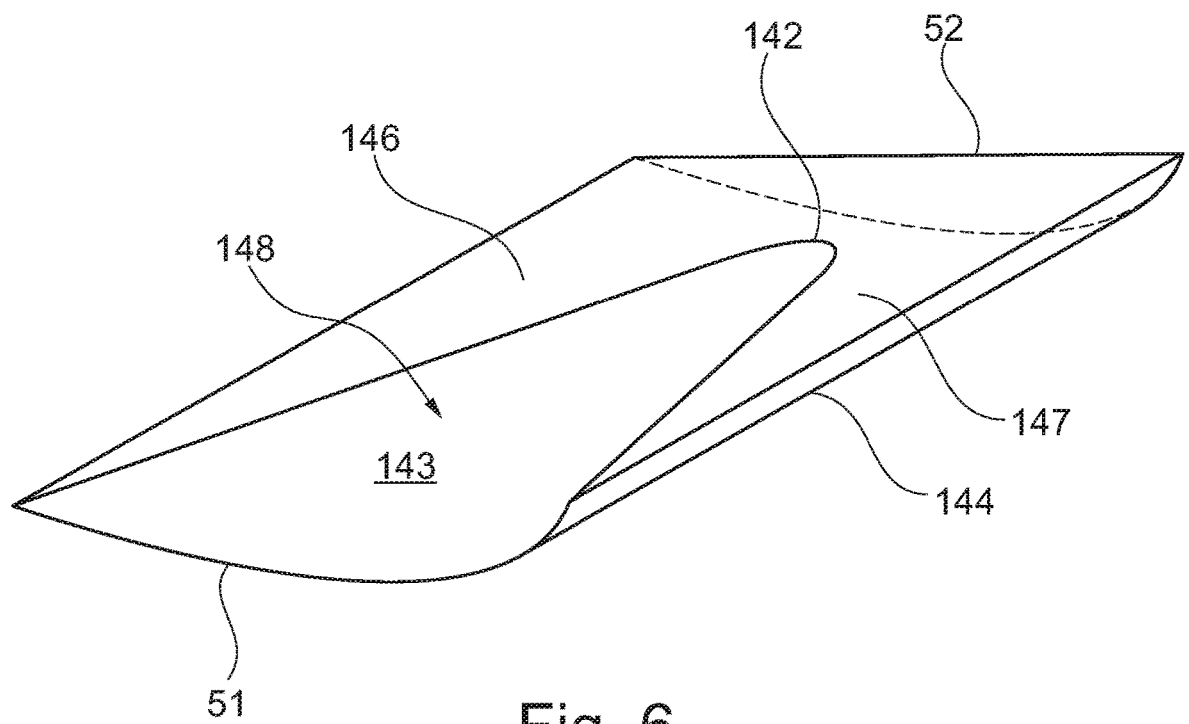
FIG. 6 is a perspective view of the insert in FIG. 5.

FIG. 6 shows the insert 50 in more detail, with the insert mould surface 143. The insert 50 extends between a proximal end 51 facing toward the mould root end 41 and a distal end 52 facing away from the mould root end 41. The insert 50 presents an insert tip end 142 which forms an end of the insert mould surface 143.

An underside 144 of the insert 50 has in this embodiment a constant cross-section. The shape of the cross-section of the underside 144 is substantially the same as the shape of the cross-section in the primary mould surface constant cross-section portion 49. At the proximal end 51, the insert mould surface 142 has a cross-sectional shape which is substantially the same as the shape of the cross-section in the constant cross-section portion 49. Thus, the proximal end 51 has a shape which is substantially the same as the cross-sectional shape of the constant cross-section portion 49. The thickness of the insert 50 at the proximal end 51 may be no larger than 10 mm, preferably no larger than 5 mm. To avoid a step in the combined mould surface, a filler material can be applied onto the primary mould surface 43, and adjacent to the insert proximal end 51.

Figure 7:
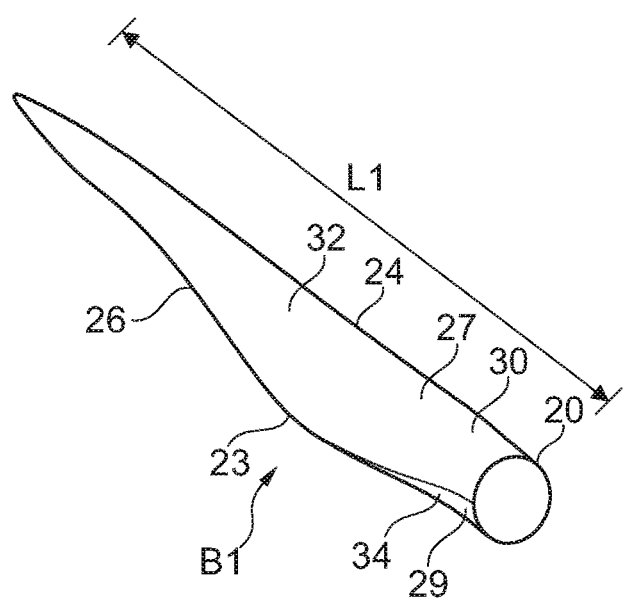
FIG. 7 is a perspective view of a blade partly produced by the mould in FIG. 5.

The method comprises forming S2, with the insert 50 in the first position, a first blade body having a first length L1. The first blade body is a shell half, which is joined with another shell half, to form a first blade B1, depicted in FIG. 7. As indicated in FIG. 7, the length L1 of the first blade B1 is the same as the length L1 of the combined mould surface in FIG. 5. Between the blade root end 20 and a portion formed by the insert, the first blade B1 has a geometry which is identical with the geometry of the blade 18 shown in FIG. 2, produced by the mould without the insert 50.

Following removal of the first blade body from the mould 40, the insert 50 can be left in the mould 40 in order to manufacture further first blade bodies having the same length L1.

Figure 8:
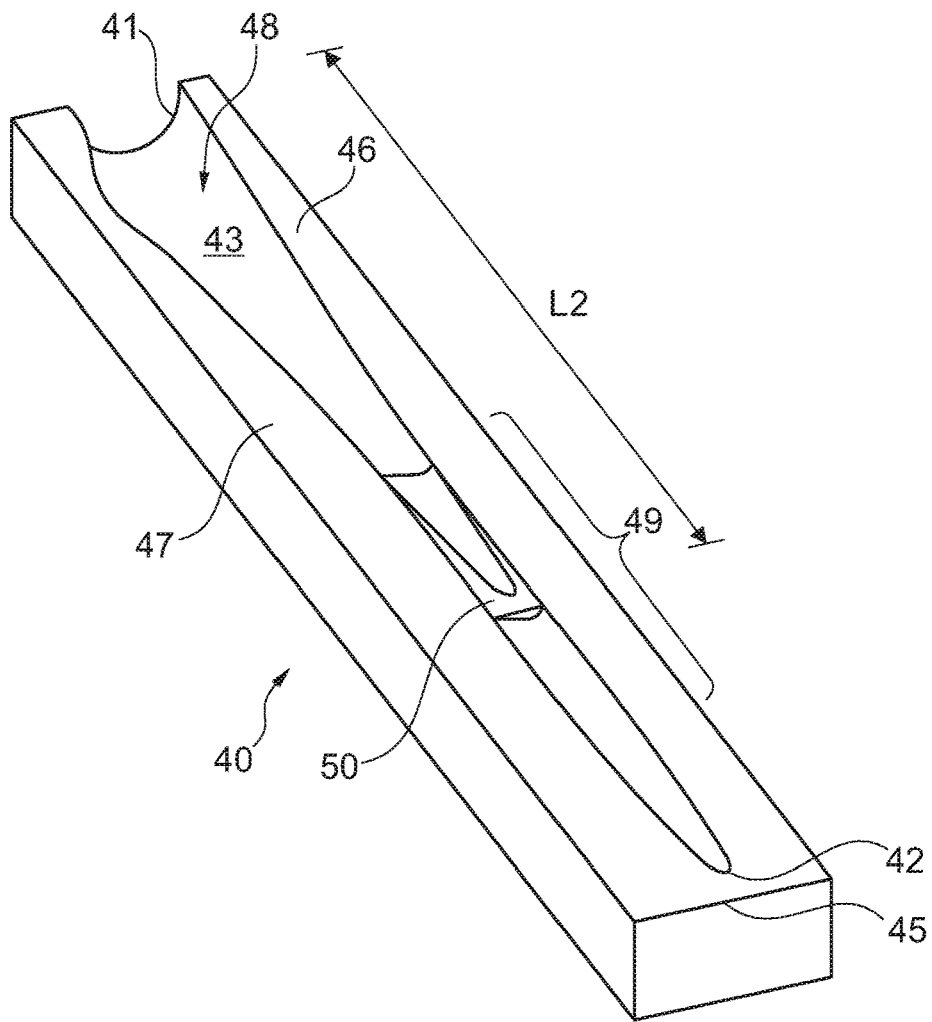
FIG. 8 shows the mould in FIG. 3 with an insert in a second position.

As depicted in FIG. 8, the method comprises placing S3 the insert 50 on the primary mould surface 43, in a second position. The insert 50 is placed within the constant cross-section portion 49. The second position is in this example, compared to the first position, closer to the mould root end 41. Thereby, the insert 50 further shortens the combined mould surface provided by the primary mould surface 43 and the insert mould surface 143. In FIG. 8, the length of the combined mould surface is L2 defined between the mould root end and the insert tip end 142.

Figure 9:
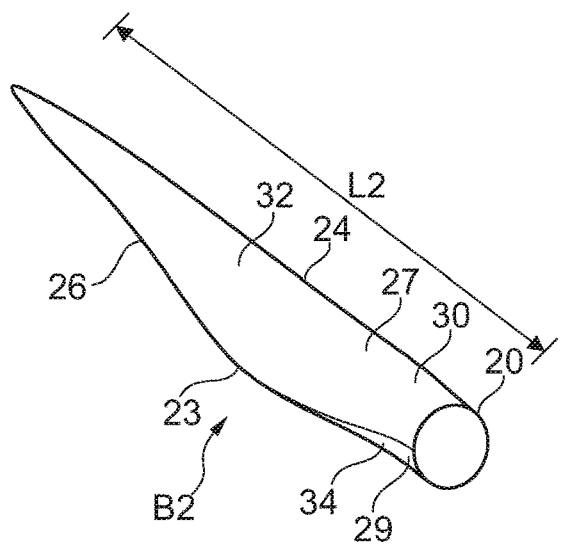
FIG. 9 is a perspective view of a blade partly produced by the mould in FIG. 8.

The method comprises forming S4, with the insert 50 in the second position, a second blade body having a second length L2. The second blade body is a shell half, which is joined with another shell half, to form a second blade B2, depicted in FIG. 9. As indicated in FIG. 9, the length L2 of the second blade B2 is the same as the length L2 of the combined mould surface in FIG. 8.

The second blade B2 has a shorter spanwise length that the first blade B1 due to the different position of the insert 50 in the mould 40. Between the blade root end 20 and the respective portions formed by the insert, the first blade B1, (FIG. 7), and the second blade B2 have geometries which are identical. Although the first and second blades B1, B2 have an identical aerodynamic surface between the root end 20 and the respective portions formed by the insert, the internal structure can vary therein. For example, as the second blade B2 has a shorter length it may be subjected to less loads in use (compared to the first blade B1) such that it does not require the same amount of structural material.

Following removal of the second blade body from the mould 40, the insert 50 can be left in the mould 40 in order to manufacture further second blade bodies having the same length L2.

With this method, a number of blade variants having different blade lengths can be formed in the same mould. For example, if L0 (FIG. 2) is 60 metres, a movable insert 50 can be used to produce a plurality of blade variants having shorter lengths, e.g. 56 metres, 55 metres and 54 metres etc. For example, variations in blade length of from anywhere between about 0.1% to about 20% can be provided, although preferably the variation in length is in the region of from about 1% to about 10%, more preferably from about 3% to about 7%. As further examples, the blade bodies formed with the mould may have a length within 90-100%, preferably 95-100%, of the length of the longest blade body that can be formed in the mould.

In yet further examples, blade bodies may be produced with lengths differing in a stepwise manner, e.g. by 100-2000 mm, or 200-1000 mm, from one blade body to another. Thereby, blade lengths may be varied within a wind farm, from some wind turbines to others, in a manner which increases the energy output of the windfarm, as described above.

Figure 10:
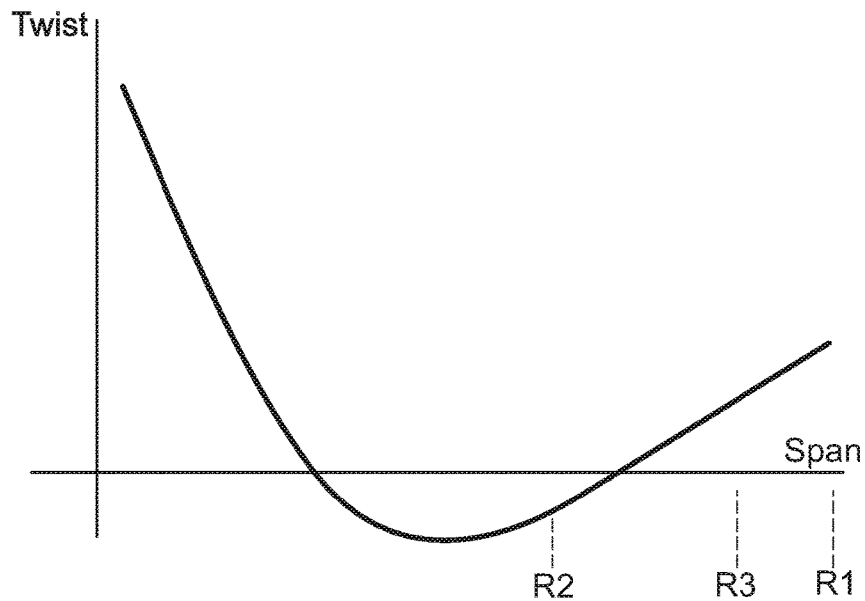
FIG. 10 is a graph showing the twist of the blade in FIG. 2.

FIG. 10 shows the twist of the blade in FIG. 2 along its span, moving from the root of the blade (at the left hand side of the abscissa) to the tip end of the blade (at the right hand side of the abscissa). As background, blade twist is necessary as the effective flow at the blade in use comprises the rotor rotational speed and the oncoming wind speed. As the peripheral speed of the blades increases along the blade span, the angle of attack of a blade section also varies along the blade span. To maintain the angle of attack and the lift force along the blade, the blade has a twist distribution from the root to the tip. The tip of the blade is also "de-twisted" in order to reduce the induced drag from the tip of the blades.

As stated, the constant cross-section portion 21 extends from a radius R2 to a radius R3. As illustrated in FIG. 10, the twist of the blade changes, in the constant cross-section portion, linearly in the spanwise direction. For this, a twist of the primary mould surface 43 (FIG. 3) changes, in the constant cross-section portion 49, linearly in the longitudinal direction of the primary mould surface 43. Thereby, a difference, at the first position (FIG. 7) and at the second position (FIG. 9), of the orientation of the insert 50 around a longitudinal axis of the primary mould surface 43, is linearly dependent on the distance between the first position and the second position. The lower side of the insert 50 preferably has a form which is complementary to the linearly changing twist of the primary mould surface 43. Thereby, the combined mould surface, formed by the insert mould surface 143 and a part of the primary mould surface 43, may be altered by moving the insert 50 from the first position to the second position, without any special provisions needed in view of the changing primary mould surface 43 twist.

Figure 11:
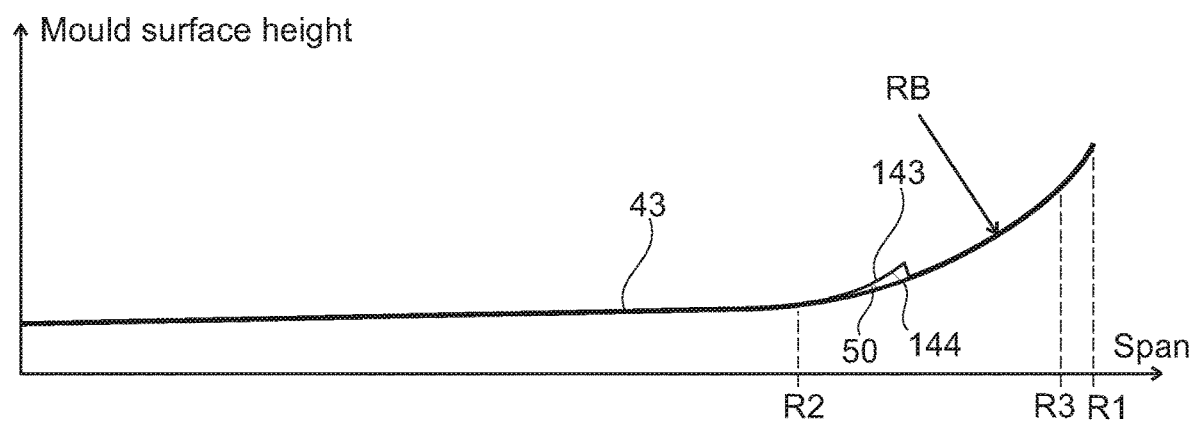
FIG. 11 is a diagram showing a curvature of the primary mould surface in a further embodiment of the invention.

Reference is made to FIG. 11. As is known per se, to avoid tower strikes, wind turbine blades may be bent in the flapwise direction, i.e. bent in a plane which is parallel to the longitudinal blade direction, and perpendicular to the chordwise direction. Such a bend may be referred to as a pre-bend.

FIG. 11 is a diagram with a side elevation of the primary mould surface in a further example. The diagram shows the primary mould surface 43 along a vertical plane in the longitudinal direction of the mould, and along the lowest part of the recess formed by the primary mould surface 43. To provide pre-bent blades, an outer part of the primary mould surface 43 is curved in the longitudinal direction so as to provide a longitudinal bend on the blade bodies.

As can be seen in FIG. 11, the curvature of the primary mould surface 43 has a constant radius RB in the constant cross-section portion, between the spanwise radii R2 and R3.

In some embodiments, a difference, at the first position and at the second position, of the orientation of the insert 50 around a lateral axis of the primary mould surface 43, is linearly dependent on the distance between the first position and the second position. The underside 144 of the insert 50 has a form which is complementary to the constant curvature primary mould surface 43. More specifically, the underside 144 of the insert 50 has a longitudinal curvature with a radius which is the same as the radius RB of the constant curvature primary mould surface 43. Thereby, the combined mould surface, formed by the insert mould surface 143 and a part of the primary mould surface 43, may the altered by moving the insert 50 between any positions within the constant cross-section portion, without any special provisions needed in view of the curved primary mould surface 43.

Figure 12:
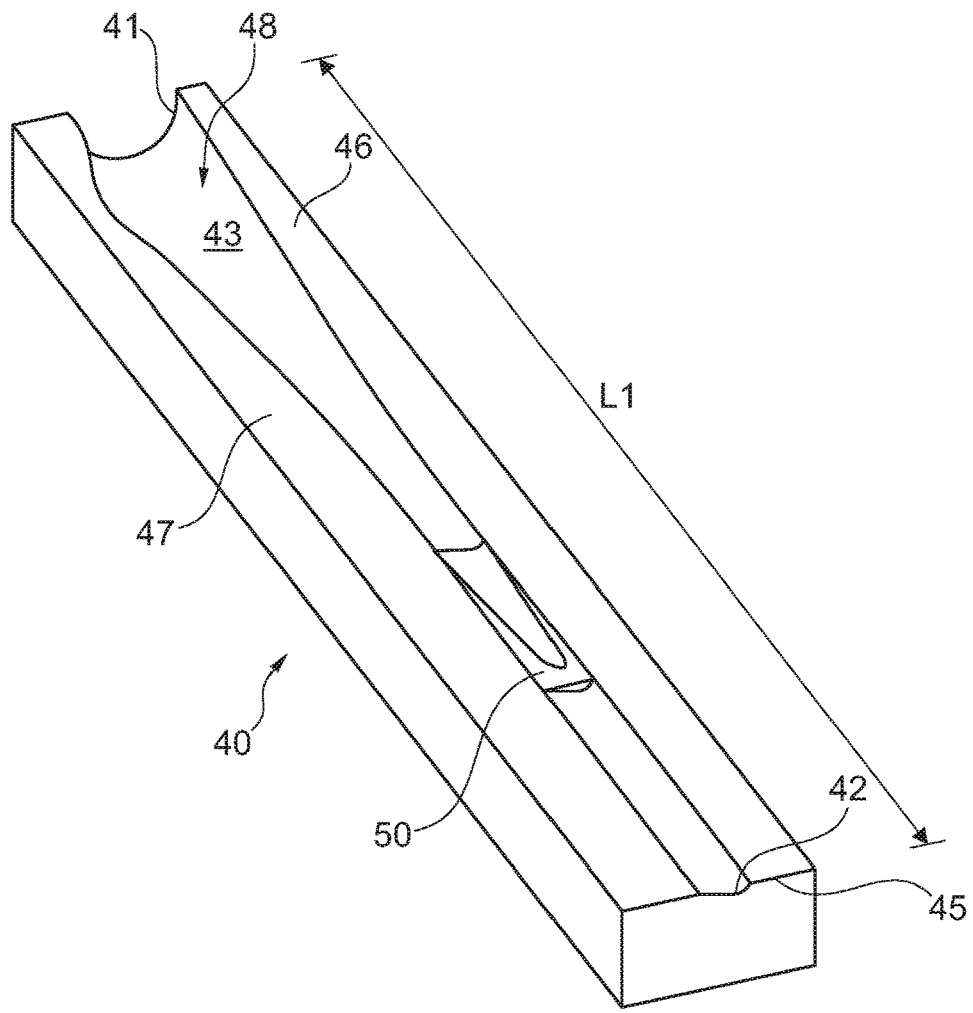
FIG. 12 is a perspective view of a mould in another embodiment of the invention.

Reference is made to FIG. 12 showing a mould in a further example. The mould 40 is not provided with a part for forming the tip of the blade bodies. Instead, the constant cross-section portion extends to the mould tip end 42. The mould tip end 42 coincides with the mould distal end 45. In addition, Thereby, the insert 50 may be placed on the primary mould surface 43, at the mould tip end 42. The insert 50 may even extend past the mould tip end 42.

Figure 13:
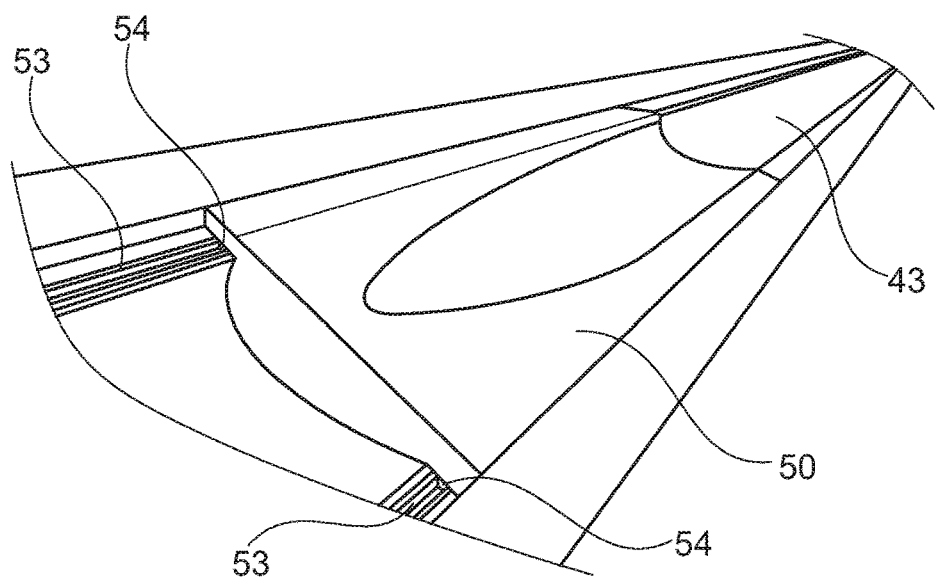
FIG. 13 is a perspective view of a part of a mould with an insert.

Reference is made to FIG. 13. Fixing the insert in the mould may be done in a variety of manners. In one example, as suggested in FIG. 13, placing the insert 50, in the first and second positions, or in any position along the constant cross-section portion 49, comprises fixing the insert 50 in a lateral direction of the primary mould surface 43, by means of a mechanical locking arrangement 53. The mechanical locking arrangement comprises in this example a track 53 extending along both opposite longitudinal edges of the primary mould surface 43. The tracks are in this example provided as elongated grooves 53. It is understood that in alternative embodiments, the tracks 53 could be provided as elongated ridges.

The mechanical locking arrangement extends along the entire constant cross-section portion 49 of the primary mould surface 43, (FIG. 3). It is understood that the opposite longitudinal edges of the primary mould surface 43 are parallel. The insert 50 may be provided with engagement means for engagement with the locking arrangement. In this example the insert 50 is provided with ridges 54 arranged to engage the tracks 53. As can be seen in FIG. 13, the insert 50 partly covers the locking arrangement 53.

Figure 14:
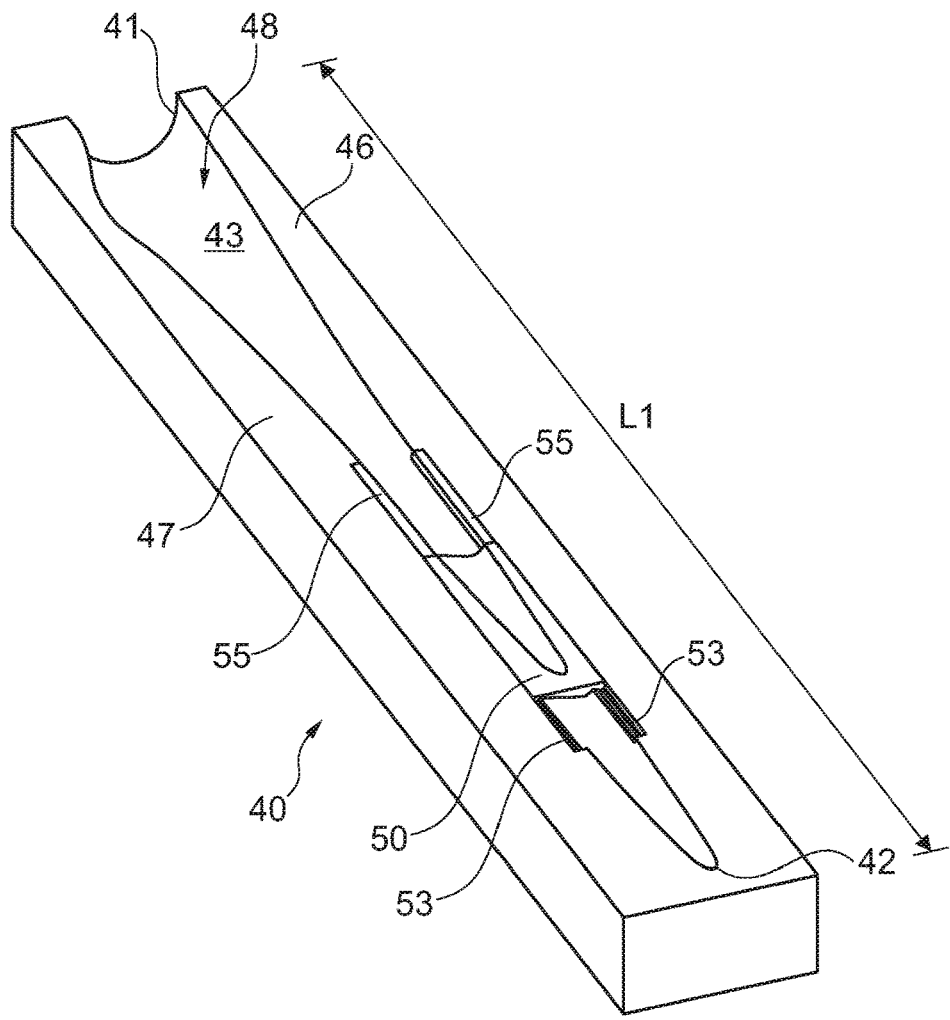
FIG. 14 is a perspective view of the mould, part of which is shown in FIG. 13.

As exemplified in FIG. 14, in some embodiments, cover devices 55 are placed to cover parts of the locking arrangement 53 not covered by the insert 50. The covering devices 55 are in this example provided as elongated elements arranged to engage the respective tracks 53 of the locking arrangement. They may, in addition to covering the part of the locking arrangement not covered by the insert 50, provide a portion of the primary mould surface 43. As exemplified below, such a primary mould surface 43 portion may form at least one of opposite longitudinal edges of the primary mould surface 43.

Alternatives are possible for the locking arrangement. For example, it may comprise rows of separated protrusions or recesses. Complementary recesses or protrusions, may be provided on the insert 50. This would allow the insert to be placed at a limited number of discrete locations along primary mould surface 43.

Below, further measures for fitting and securing the insert 50 to the mould, disclosed in said WO2017088883A1, incorporated herein by reference, are described with reference to FIG. 15 to FIG. 19.

Figure 15:
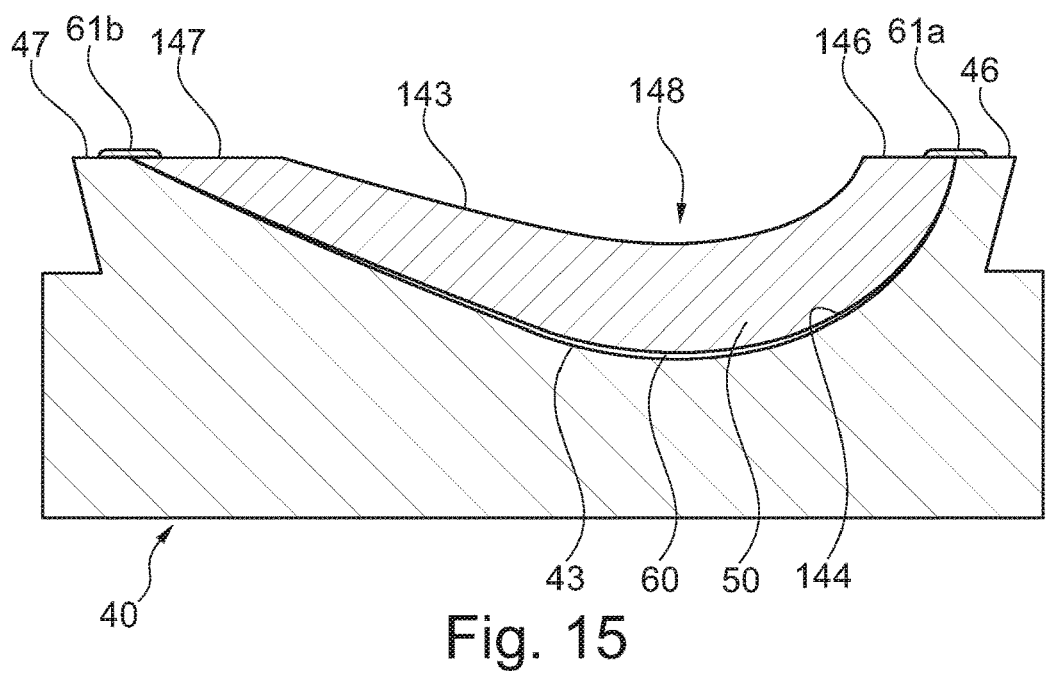
FIG. 15 is a cross section of a wind turbine rotor blade mould with an insert in the mould.
Figure 16:
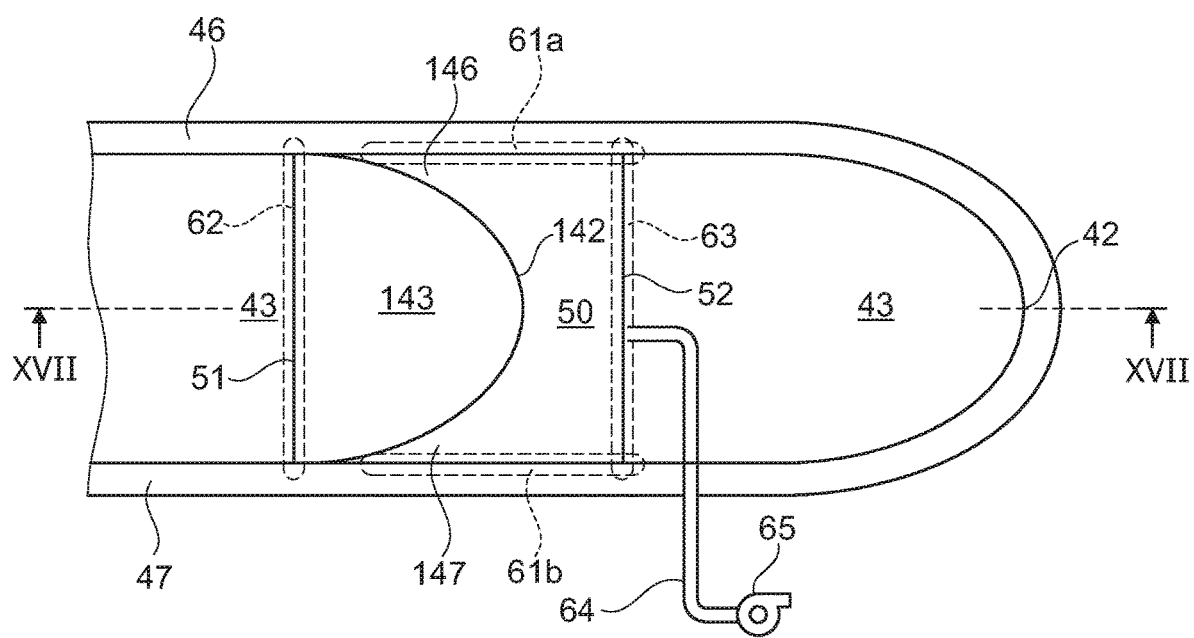
FIG. 16 is a plan view of a part of the mould in FIG. 15 with the insert in the mould.

FIG. 15 and FIG. 16 show how the insert 50 may be held to the mould 40 via a vacuum. FIG. 15 is a cross-sectional view through the mould 40 and the insert 50, and FIG. 16 is a plan view. The insert 50 is placed in the mould 40 such that the insert leading edge flange 146 is aligned with the mould leading edge flange 46, and the insert trailing edge flange 147 is aligned with the mould trailing edge flange 47. As can be seen in FIG. 15, there is a gap 60 between the primary mould surface 43 and the underside 144 of the insert 50. This gap has a height of the order of 0.1 mm. The gap 60 allows an under pressure to be created between the insert 50 and the mould 40 so that the insert is retained in a fixed position against the mould. It will be appreciated that the gap 60 is shown enlarged in the figures for clarity.

A seal is provided between the mould 40 and the insert 50. Referring to FIG. 16, the following seals are provided:

(i) a seal 61a over the joint between the insert leading edge flange 146 and the mould leading edge flange 46. This seal can be a Polytetrafluoroethylene (PTFE) tape.

(ii) a seal 61b over the joint between the insert trailing edge flange 147 and the mould leading edge flange 47. This seal can be a PTFE tape.

(iii) a seal 62 over the joint between the primary mould surface 43 and the insert mould surface 143 at the proximal end 51 of the insert 50. This seal can be a PTFE tape.

(iv) a seal 63 over the joint between the insert 50 and the primary mould surface 43 at the distal end 52 of the insert 50. This seal 63 can be formed from a vacuum film with sealant tape around its periphery.

After the seals have been provided around the insert 50, a vacuum line 64 is attached and passes through the vacuum film of seal 63. A vacuum pump 65 then evacuates the air under the seal 63 which will also evacuate the air from the gap 60. Compared to the ambient air pressure, the pressure in the gap 60 will be at a relatively lower pressure such that the insert 50 is 'sucked' down onto the mould 40.

FIG. 17a to FIG. 17d are schematic cross-section views along the line XVII-XVII of FIG. 16. FIG. 17a to FIG. 17d illustrate the steps taken to manufacture the wind turbine blade shell in the mould 40 with the insert 50.

Figure 17A:
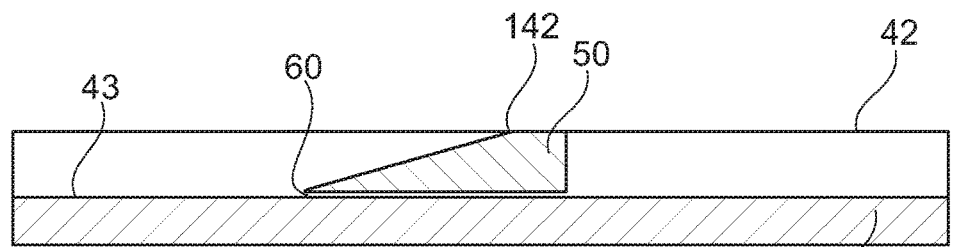
FIG. 17*a* to FIG. 17*d* are cross section views of the mould in FIG. 15, along the line XVII-XVII of FIG. 16, with the insert in the mould, showing how the blade is fabricated.

FIG. 17a shows the insert 50 placed in the mould 40. As can be seen there is the gap 60 between the primary mould surface 43 and the underside of the insert 50.

Figure 17B:
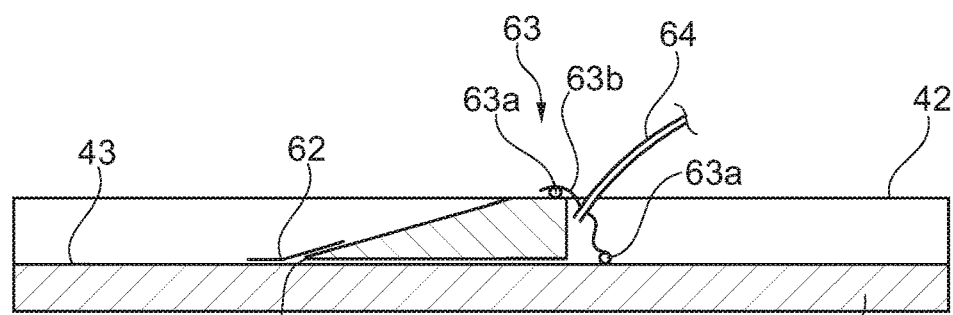

Next, as shown in FIG. 17b, the insert 50 is sealed against the mould 40 so that it is retained firmly in position. A seal 62 is provided between the proximal end 51 of the insert and the primary mould surface 43 as discussed above. The seal 63 at the distal end of the insert comprises strips of sealing tape 63a (for example butyl rubber) and a vacuum film 63b which provides an effective seal. Also shown in FIG. 17b is the vacuum line 64. The cavity under the vacuum film 63b is evacuated which as discussed above will force the insert 50 against the mould 40 and hold it tightly in position.

Figure 17C:
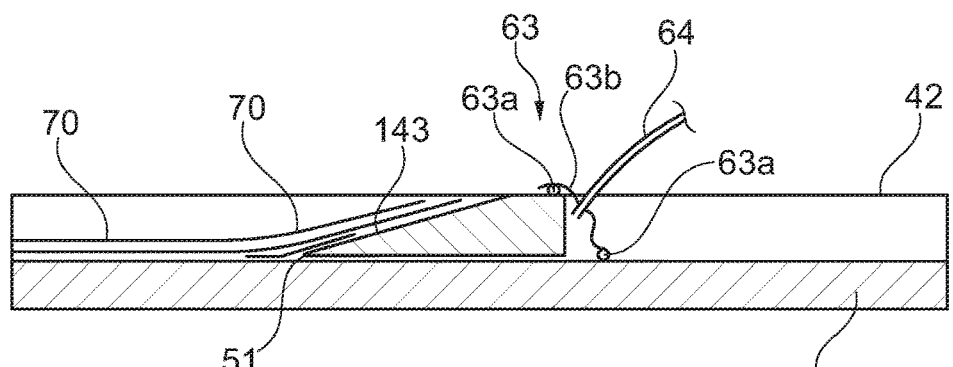

FIG. 17c shows the blade materials being laid into the mould, onto the primary mould surface 43 and the insert mould surface 143. In this example, the blade materials 70 comprise layers of pre-preg glass fibres and optionally sandwich core panels.

Figure 17D:
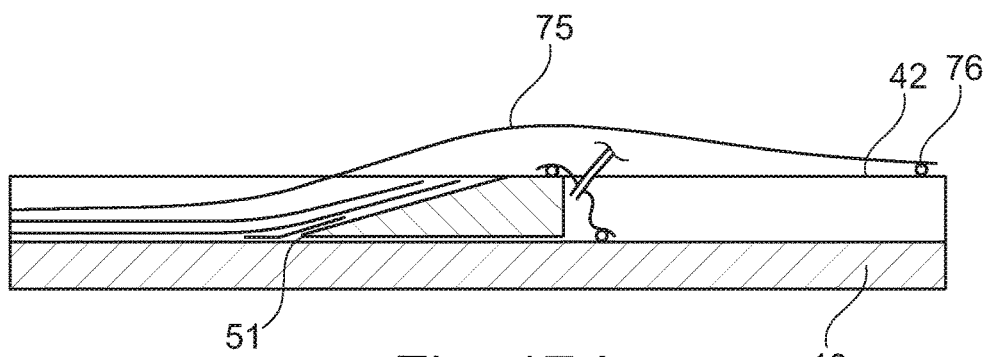

In FIG. 17d the blade materials 70 are covered with a vacuum film 75 and the cavity under the vacuum film 75 is evacuated in order to consolidate the blade materials as is conventional in a composite fabrication operation. The vacuum film 75 is sealed around the periphery of the mould with sealant tape 76. Then the mould is heated in order to cure the blade materials 70. The insert 50 may be heated by absorbing heat from the mould. Alternatively, or in addition, the insert 50 can have inbuilt electrical elements so that the insert can have its own heating system for curing the modified tip end of the blade.

The vacuum line 64 which is used to retain the insert 50 in position on the mould 40 can pass between the vacuum film 75 and the periphery of the mould 40. When air is evacuated from under the vacuum film 75 the vacuum film 75 will hold the insert 50 against the mould and it is not necessary to keep the vacuum pump 65 running.

Figure 18A:
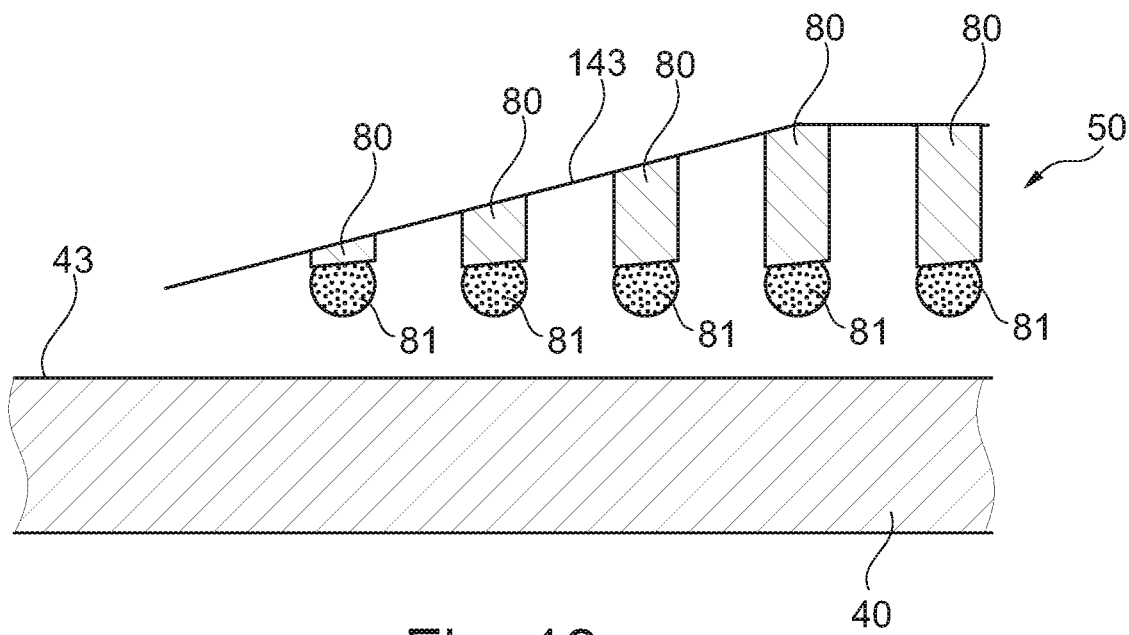
FIG. 18*a* and FIG. 18*b* are cross section views of the mould in FIG. 15 showing how the insert is positioned on the mould.
Figure 18B:
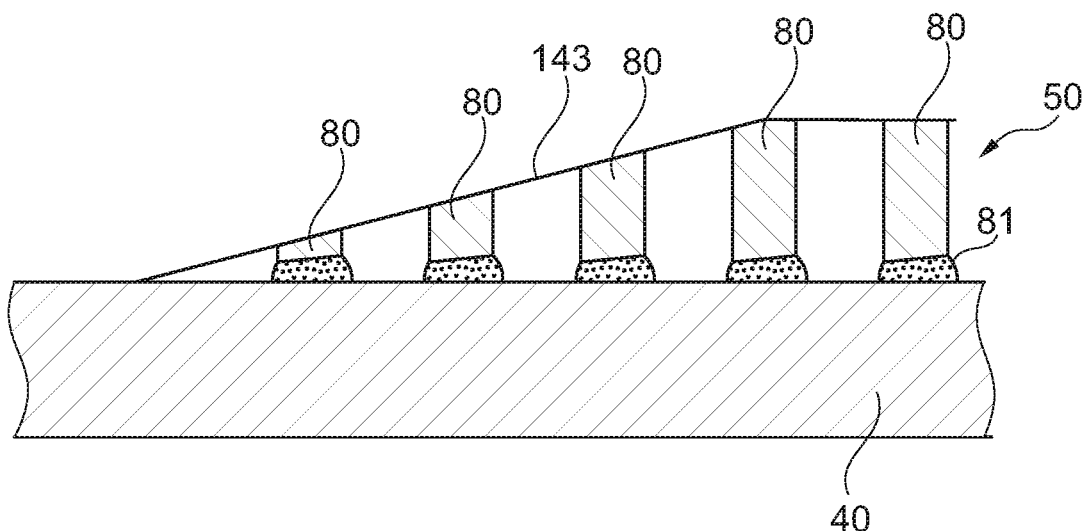

Reference is made to FIG. 18a and FIG. 18b. As stated, the insert may have a shape which is complementary to the constant cross-section portion. FIG. 16a and FIG. 16b show schematically how the insert 50 can be manufactured such that it has an accurate fit with the primary mould surface 43 of the mould 40. In this example, the insert mould surface 143 is formed from glass fibre reinforced plastic (GFRP). Extending from an underside of the insert mould surface are a plurality of ribs 80 formed from core material. In this example, the ribs are formed from PET foam, but other structural core materials could be used. In other words, the ribs extend from the insert mould surface 143 toward the primary mould surface 43. The ribs 80 are fabricated such that they do not extend all the way to the primary mould surface 43. At the end of each rib 80, opposite the insert mould surface 143 there is a bead of uncured adhesive 81, e.g. epoxy or PUR adhesive. The primary mould surface 43 of the mould 40 has been treated with a release agent. As shown in FIG. 18a, the insert 50 is first held above the primary mould surface 43 of the mould 40 and then it is lowered such that the adhesive beads 81 make contact with the primary mould surface 43 shown in FIG. 18b. This compresses and deforms the adhesive beads 81 to the shape of the primary mould surface 43.

The insert 50 is held in the correct place on the mould 40 via clamps or the use of a jig. While the insert 50 is being held, the adhesive beads 81 will cure and thus this will provide an accurate matching shape between the insert 50 and the primary mould surface 43. Thus, the bottom of the adhesive beads 81 become the underside 144 of the insert. As the primary mould surface 43 has been treated with a release agent, once the adhesive beads 81 have cured, the insert can be lifted from the mould 40 ready for use in a blade manufacturing process. As all moulds 40 can be slightly different due to manufacturing tolerances, it is desirable to produce a bespoke insert 50 for each mould, and the use of the adhesive beads 81 provides a quick and simple solution to create an accurate alignment between the mould and the insert 50. To provide the gap 60 which allows the insert 50 to be held to the mould 40 by vacuum, grooves can simply be scored in the cured adhesive beads 81.

Figure 19:
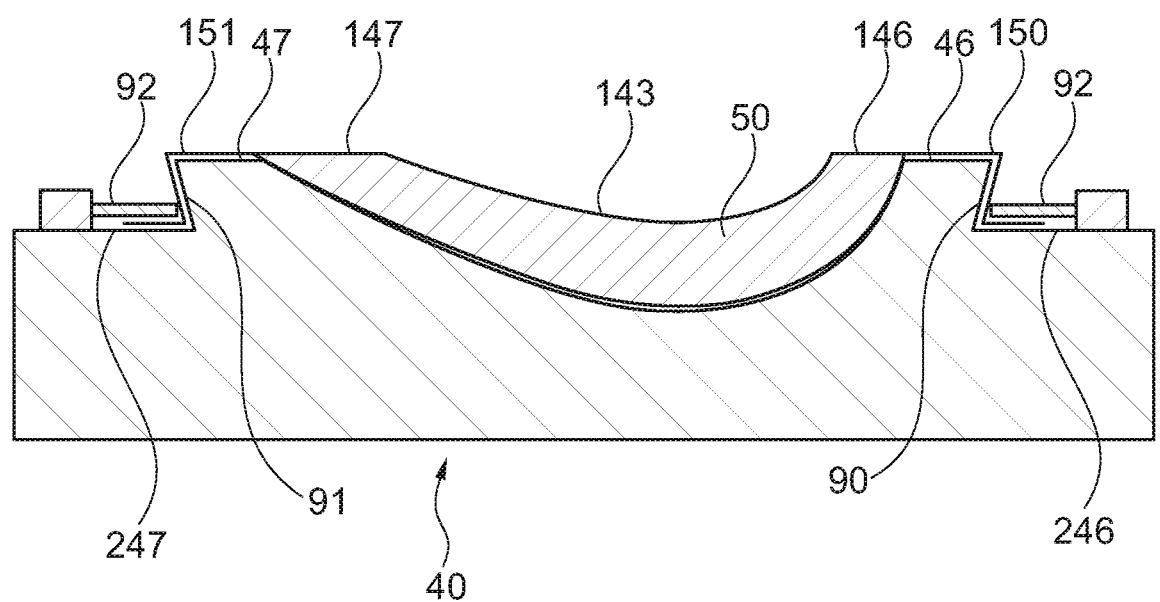
FIG. 19 is a further cross section of a wind turbine rotor blade mould with an insert in the mould.

FIG. 19 shows a more detailed example of how the insert 50 can be secured to the mould 40. The mould 40 comprises a leading flange 46 and a trailing edge flange 47 as described above. Located below these flanges are a leading edge process flange 246 and a trailing edge process flange 247. These process flanges 246, 247 are connected to the mould flanges 46, 47 via side surfaces of the mould 90 and 91. The mould side surfaces extend in a substantially vertical plane. In this example, the side surfaces of the mould are inclined relative to the vertical plane. The inclined surface 90 is formed such that there is an acute angle between the inclined surface 90 and the process flange 246. Similarly, the inclined surface 91 is formed such that there is an acute angle between the inclined surface 91 and the process flange 247. The insert 50 is fabricated with a strip 150 of GFRP which extends out from the insert leading edge flange 146, over the mould leading edge flange 46, inclined surface 90 and leading edge process flange 246. The strip 150 is held against the inclined surface 90 with a clamp 92 which is connected to the leading edge process flange 246.

On the trailing edge side, the insert 50 is fabricated with a strip 151 of GFRP which extends out from the insert trailing edge flange 147, over the mould trailing edge flange 47, inclined surface 91 and trailing edge process flange 247. The strip 151 is held against the inclined surface 91 with a clamp 92 which is connected to the trailing edge process flange 247. By connecting the insert 50 at the process flanges 246, 247 the insert 50 is held more securely on the mould 40 than if it was just connected at the leading edge mould flange 46 and the trailing edge mould flange 47. This is because the insert 50, through the strips 150 and 151 can be clamped securely at these places. In addition, the inclined surfaces 90 and 91 provide a negative draft angle and therefore help to prevent the insert 50 from moving relative to the mould 40.

A vacuum seal (not shown) is provided between the strip 150 and the leading edge process flange 246 and between the strip 151 and the leading edge process flange 247. Vacuum seals are also provided at the proximal end and the distal end of the insert as described with reference to FIG. 16. Therefore, the insert 50 is held in place against the mould by a vacuum force and by the clamps 92.

The strips 150 and 151 are formed from GFRP and are typically just 0.5 millimetres thick. Thus they can be elastically deformed to fit around the negative draft angles of the inclined surfaces 90 and 91.

By "negative draft angle" is meant that the surfaces 90 and 91 are inclined relative to the mould flanges such that the insert 50 cannot be directly lifted off the mould 40 as the strips 150 and 151 will clash with the inclined surfaces. Instead, some force has to be applied to the strips 150, 151 in order to deform them and lift the insert from the mould.

The clamps 92 may also be in the form of bolts which connect the insert 50 to the process flanges 246, 247 of the mould 40. Using bolts is advantageous because holes in the insert 50 can be aligned with corresponding holes on the mould 40, so that the insert 50 is always located at the correct position when placed on the primary mould surface 43.

In the example shown in FIG. 19 the side surfaces of the mould 90, 91 both have a negative draft angle. However, in another example, only one of the side surfaces has a negative draft angle, and the other side surface has a zero draft or a positive draft angle. This arrangement will accommodate more variations in fit between the mould 40 and the insert 50. In a further example (not shown) there may be no draft angles and the insert 50 is primarily held to the mould via the vacuum, but there are also clamps (such as bolts) to hold the insert 50 in the event of a vacuum failure. These bolts may connect the insert 50 to the process flanges 246, 247 of the mould 40.

Many alternatives to the examples described are possible and will occur to those skilled in the art without departing from the scope of the invention which is defined by the following claims.

For example, although the moulds are described above as forming one half of a wind turbine blade, the principle of providing a movable insert is applicable to any suitable method of blade manufacture in a mould. For example, it is applicable to blades formed as a single piece within a single mould cavity, or to blades formed from any number of sub-components which are subsequently assembled.

The invention claimed is:

1. A wind turbine blade body manufacturing method, the method comprising the steps of:
   providing a mould having an elongated mould surface,
   placing a movable insert on the mould surface, in a first position,
   forming, with the insert in the first position, a first blade body having a first length,
   placing the insert on the mould surface, in a second position, and
   forming, with the insert in the second position, a second blade body having a second length which is different from the first length, wherein:
     a difference, at the first position and at the second position, of the orientation of the insert around a longitudinal axis of the mould surface, is linearly dependent on the distance between the first position and the second position, and/or
     a difference, at the first position and at the second position, of the orientation of the insert around a lateral axis of the mould surface, is linearly dependent on the distance between the first position and the second position.

2. The method according to claim 1, wherein the mould surface extends from a mould root end to a mould tip end, and comprises a portion presenting a constant cross-section, wherein the steps of placing the insert, in the first and second positions, comprises placing the insert with a proximal end thereof facing toward the mould root end, and placing the proximal end within the constant cross-section portion.

3. The method according to claim 2, wherein the proximal end has a shape which is substantially the same as the cross-sectional shape of the constant cross-section portion.

4. The method according to claim 1, wherein the steps of placing the insert, in the first and second positions, comprises fixing the insert in a lateral direction of the mould surface, by means of a mechanical locking arrangement extending along at least one of opposite longitudinal edges of the mould surface.

5. The method according to claim 4, wherein fixing the insert comprises placing the insert so as to partly cover the locking arrangement, wherein a cover device is placed to cover a part of the locking arrangement not covered by the insert.

6. The method according to claim 1, wherein the insert presents an insert tip end for forming a tip of the first and second blade bodies.

7. The method according to claim 1, further comprising:
   selecting the lengths of the first and second blade bodies based on required lengths of respective blades for a first wind turbine and a second wind turbine, and selecting the first and second positions to form the first and second blade bodies with the selected lengths.

8. A wind turbine blade installation method, comprisinl
   providing the first blade body and the second blade body according to the method of claim 1, mounting on a first wind turbine in a wind farm, a first blade comprising the first blade body, and mounting on a second wind turbine in the wind farm, a second blade comprising the second blade body.

9. A wind turbine blade body manufacturing apparatus comprising:
   a mould, having an elongated mould surface extending from a mould root end to a mould tip end, and
   a movable insert, the apparatus being arranged to allow the insert to be placed on the mould surface, in a plurality of positions along the longitudinal direction of the mould surface, for forming blade bodies having respective lengths which are dependent on the insert position along the longitudinal direction of the mould surface,
   wherein, in the constant cross-section portion, a twist of the mould surface changes linearly in the longitudinal direction of the mould surface.

10. The apparatus according to claim 9, wherein the mould surface comprises a portion presenting a constant cross-section.

11. The apparatus according to claim 10, wherein the insert comprises a proximal end arranged to face toward the mould root end and a distal end arranged to face away from the mould root end, the proximal end having a shape which is substantially the same as the cross-sectional shape of the constant cross-section portion.

12. The apparatus according to claim 10, wherein at least a part of the mould surface is curved in the longitudinal direction so as to provide a longitudinal bend on the blade bodies, the curvature of the mould surface being constant in the constant cross-section portion.

13. The apparatus according to claim 10, wherein the mould presents, at the constant cross-section portion, a mechanical locking arrangement along at least one of opposite longitudinal edges of the mould surface, for fixing the insert in a lateral direction of the mould surface.

14. The apparatus according to claim 13, wherein the insert is arranged to partly cover the locking arrangement, the apparatus further comprising a cover device arranged to cover a part of the locking arrangement not covered by the insert.

15. A wind turbine blade body manufacturing method, comprising forming a blade body with an apparatus according to claim 9, and with the insert in one of the plurality of positions.

16. The method according to claim 15, wherein the blade body has a length within 90-100%, of the length of the longest blade body that can be formed in the apparatus.

* * * * *